(12) United States Patent
Goldman

(10) Patent No.: US 7,274,997 B1
(45) Date of Patent: Sep. 25, 2007

(54) METHOD OF MEASURING DISCRETE, INCREMENTAL FEEDBACK FROM MOTION DEVICES

(76) Inventor: Craig E. Goldman, 11 Woodcrest Rd., Westborough, MA (US) 01581

( * ) Notice: Subject to any disclaimer, the term of this patent is extended or adjusted under 35 U.S.C. 154(b) by 0 days.

(21) Appl. No.: 10/642,859

(22) Filed: Aug. 18, 2003

Related U.S. Application Data

(60) Provisional application No. 60/404,673, filed on Aug. 20, 2002.

(51) Int. Cl.
*G01R 25/00* (2006.01)
*G06F 19/00* (2006.01)

(52) U.S. Cl. ............................ 702/57; 700/187; 702/79

(58) Field of Classification Search .................. 702/19, 702/57, 79, 151; 351/211; 318/254; 701/108, 701/109; 700/187; 341/143
See application file for complete search history.

(56) References Cited

U.S. PATENT DOCUMENTS 3,699,317 A * 10/1972 Middleditch ................ 700/187

* cited by examiner

*Primary Examiner*—Bryan Bui
*Assistant Examiner*—John Le
(74) *Attorney, Agent, or Firm*—Brian M. Dingman; Mirick O'Connell DeMallie & Lougee

(57) ABSTRACT

A method of measuring discrete incremental feedback from motion systems that creates a discrete feedback pulse for every unit of motion that is accomplished by the motion system. The method comprises establishing a minimum feedback pulse sampling period, and accumulating feedback pulses during a sampling period. Upon the first feedback pulse after the minimum feedback pulse sampling period has passed, the current sampling period is ended, and the next sampling period is begun. The quantity of feedback pulses accumulated during the current sampling period is then determined.

8 Claims, 1 Drawing Sheet

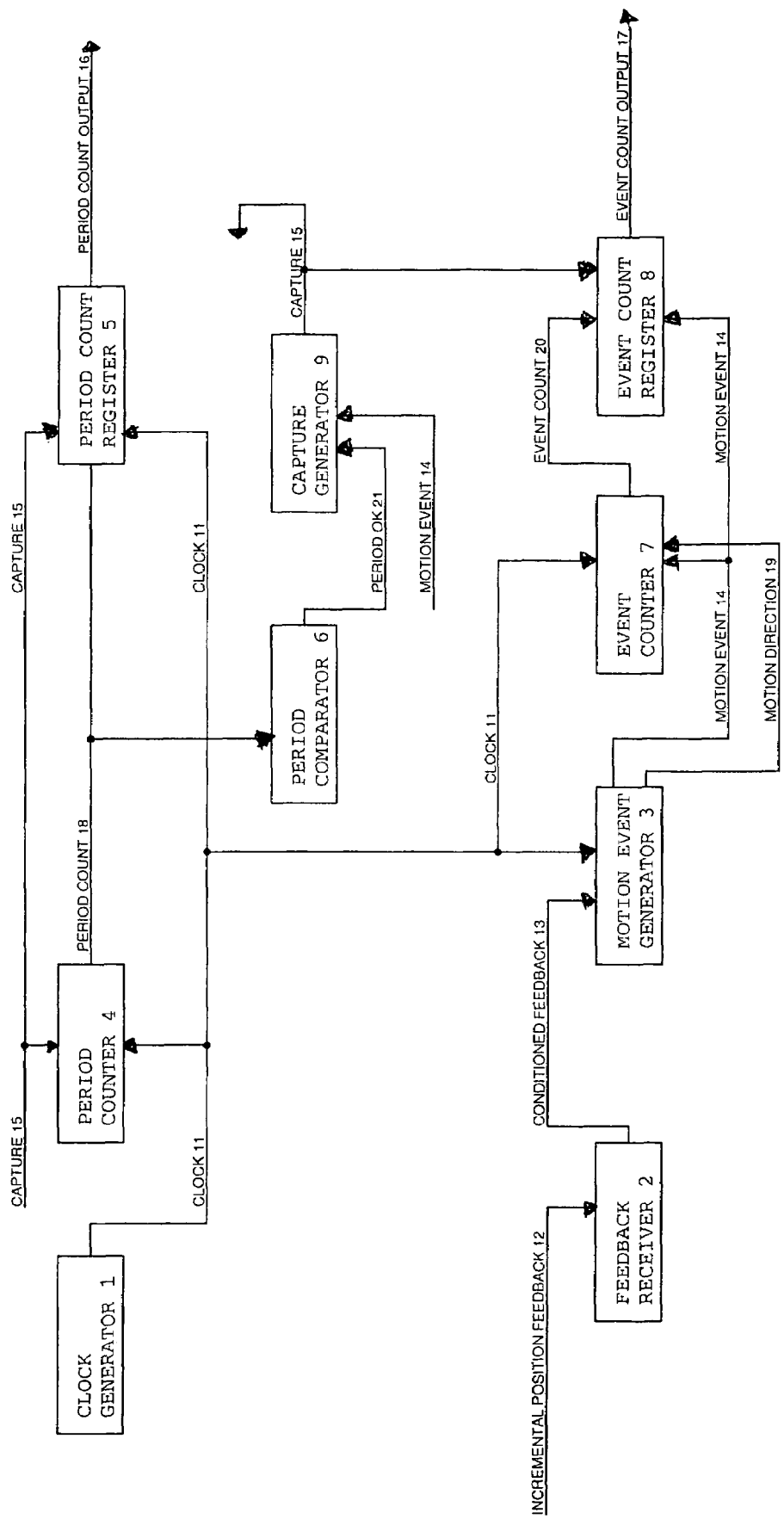

METHOD OF MEASURING DISCRETE, INCREMENTAL FEEDBACK FROM MOTION DEVICES

CROSS REFERENCE TO RELATED APPLICATION

This application claims priority of Provisional application Ser. No. 60/404,673, filed on Aug. 20, 2002.

FIELD OF THE INVENTION

This invention relates to a method of measuring discrete, incremental feedback from motion devices.

BACKGROUND OF THE INVENTION

A typical motion system consists of four elements, a motion controller that directs the motion, a motion actuator, a driver unit that controls power applied to the motion actuator, and a feedback device that measures the motion and provides feedback to the controller. Two types of feedback are typically used—incremental and absolute. In a typical motion system, the motion controller provides a signal to the motor driver that causes the motor to turn. As the feedback device, the pulse encoder creates a discrete pulse for every unit of motion that occurs and sends this pulse back to the motion controller. This is referred to as a motion event. The motion controller accumulates these incremental feedback pulses over a period of time to determine the actual position of the device. Further, using the change in position over time, the motion controller can also calculate actual velocity, acceleration and jerk. In classic closed-loop control, the motion controller also calculates the intended position of the device at the end of each fixed period using given values for velocity, acceleration and jerk. The controller then compares the intended position with the actual position to produce an "error" value. An electrical signal is produced based on the "error" and this is sent to the motor driver to provide more or less power to the motor.

Historically, in digital motion control systems, the feedback pulses (motion events) are accumulated over a fixed period of time, because having a fixed motion event accumulation period simplifies the motion control process. A fixed motion period provides a fixed denominator for calculating velocity (i.e. velocity equals change in position divided by the motion period). Similarly, fixed motion periods aid in the calculation of acceleration and jerk. In a digital motion control system, choosing an opportune value for the fixed motion period can create further reductions in the motion calculations. Digital control systems using a microprocessor require a certain amount of time to calculate the resultant "error" value. For this reason, the fixed period of motion accumulation is almost always at least the worst-case time for these calculations.

One problem with accumulating the motion events over a fixed period of time is well known in the trade, and is referred to as "quantization error". Quantization error occurs because the controller only accumulates discrete events. The controller cannot determine when the next motion event will occur; therefore at the end of any period there is usually some amount of motion that is not accounted for. The position error associated with this small amount of motion is negligible, but the short sampling period magnifies the effect of the unaccounted motion to create larger uncertainties in velocity and acceleration measurements.

The proportional uncertainties are most profound when the velocity of the motion is nearly one event per sample period. For example, if the motion system is accumulating pulses (motion events) over 1 millisecond, the uncertainty is greatest when the velocity is nearly one thousand pulses per second. A motion velocity of 1500 pulses per second will be captured as one pulse per millisecond in one period and two pulses per millisecond in the next. The motion controller can misinterpret these readings to assume the motion velocity is oscillating between 1000 pulses per second and 2000 pulses per second, even though the both the desired and actual velocities are 1500 pulses per second. A similar situation can occur when the motion velocity is less than one pulse per sample period.

The problem of properly recording less than one pulse per sample period is so acute that some higher performance motion systems handle this situation as a special case. When the motion produces less than one incoming pulse per sample period, these systems will measure the time between successive pulses and use this time in the velocity calculation. Instead of measuring the time between motion pulses, some systems with quadrature encoder feedback measure the pulse width of one of the quadrature phases. This has the effect of measuring the time for two successive motion counts and is similar to measuring the time between successive pulses.

Even at motion velocities substantially different than one pulse per sample period, quantization error can substantially compromise the ability of the motion controller to estimate the actual instantaneous velocity. Again, with a one-millisecond sample period, an actual velocity of 9900 pulses per second will be recorded as 9000 pulses per second in some periods and 10000 pulses per second in others.

More frequent sampling of the motion (i.e. shorter sampling periods) does not repair the situation. To illustrate, we can use some of the same motion velocities as above, but calculate the results of reducing the sample period to 200 microseconds. A motion of 1500 pulses per second will be recorded as no motion for two or three sample periods and a single motion equivalent to 5000 pulses per second in the next. A motion velocity of 9000 pulses per second will be recorded as two pulses in most sample periods and one every fifth period. The one pulse per sample period appears to be a velocity of 5000 pulses per second; two pulses in a sample period appears to be a velocity of 10000 pulses per second.

In recent years, the issues resulting from quantization error have become more acute. Feedback encoders have become more precise, creating more pulses for a given distance moved. Motor speeds have increased, creating more pulses per period. Faster automation has led to shorter motion travel times. In addition, many motion systems now require precise velocity and acceleration profiles, not just position, in order to coordinate the motion of multiple axes.

SUMMARY OF THE INVENTION

It is therefore an object of this invention to provide a method of measuring discrete, incremental feedback from motion systems that has a variable feedback pulse sampling period.

It is a further object of this invention to provide such a method in which the estimated motion velocity is more accurately determined.

It is a further object of this invention to provide such a method in which the quantization error is minimized.

For simplicity, the remainder of this disclosure will describe an electric motor as the motion actuator, an electric motor drive as the driver unit, and a pulse encoder as the feedback device, although these are not limitations of the invention. The invention is also applicable to pneumatic, magnetic or any other motion system. It also does not matter whether the feedback signals are quadrature-encoded, pulse-direction, or another form, as long as the feedback signals are both incremental and discrete.

Also, even though the invention is described in the context of a motion control system, it can be used purely as a method of measuring motion, without using the information directly for control. One application of the invention for such is for a "motion meter" that provides better motion information for testing, tuning and verifying motion of factory-floor machinery.

To eliminate the uncertainty, the unmeasured portion of the motion must be eliminated. Since the system cannot anticipate when the next motion event will occur, eliminating the unmeasured portion is not possible using fixed periods. Thus, the inventive method of measuring incremental motion feedback adjusts the period of time for the measurement (the sample period). In the invention, every sampling period ends coincident with the occurrence of a motion event. Since the end of one period is the beginning of the next period, this means every sampling period also begins coincident with the occurrence of a motion event.

To implement this method, the system must contain a high frequency clock. Because the clock periods will be used to measure the time between motion events, this clock should have a period that is significantly shorter than the shortest period between events. A factor of ten should be considered a practical (although not absolute) minimum. As an example, if the maximum expected velocity is five million events per second, the clock frequency should be at least fifty-megahertz, and preferably higher.

In an ideal system, one could measure the time between every motion event using the high frequency clock. Real systems, however, require a certain amount of time to record and process the incoming motion events and calculate velocity, acceleration and/or other calculated values. So, for pragmatic reasons the system must still have a minimum sampling period to provide enough time to perform these calculations. Therefore, similar to current motion systems, a system using the invention will need to accumulate motion events over a minimum period of time. But unlike current systems, the sampling period in the invention is not fixed. Instead, the sampling period ends concurrent with the first event after the minimum time has elapsed.

As one example, assume a monitoring system using the invention has a 100 MHz clock; sampling periods will be multiples of 10 nanoseconds. In this example, the minimum sampling period is set to 100 microseconds. Now, consider a turning motor that produces a motion event every 17.85714 microseconds (approximately 56,000 motion events per second). The sample period would end coincident with the first event occurring after the 100 microsecond minimum sampling period, which is the sixth recorded motion event. Thus, the actual sampling period would be about 107.15 microseconds. (It should be appreciated that real system irregularities might cause a time measurement of 107.14 or 107.16 microseconds.) The estimated motion velocity from this sample is calculated by dividing the 6 events by 107.15 microseconds, producing a result of 55,996 motion events per second, an error of −0.007%. The prior art method, using a fixed sampling period, would have recorded either 5 or 6 events in the fixed period of 100 microseconds. This produces estimated results of 50,000 or 60,000 motion events per second, with corresponding errors of 10.71% and −6.67%, respectively.

It may appear at first that the accuracy of both the traditional fixed sampling period method and the variable sampling period method according to the invention can be improved by lengthening the (minimum) sample period. However, in real motion systems, the motion is not maintained at a single velocity. Long sample periods average the data over the sampling period, resulting in loss of the fine details of the motion. Even in motion systems that attempt to maintain a fixed velocity over time, the actual motion produced by the system can vary considerably. Measuring the fine details of this motion is an important first step to improving the user's understanding of the system, and ultimately to improving the control of the motion.

Multi-axis Coordinated Motion Control

One of the areas that can benefit significantly from the invention is multi-axis coordinated motion control. In a simple motion control system with coordinated motion, the movement of one axis, called the "slave axis", is determined by a formula based on the measured movement of another axis, called the "master axis". One of the main problems of coordinated motion is accurately determining the velocity of the master axis. The problem is more significant than single axis motion control because, depending upon the formula for determining the slave axis movement, small motion changes in the master axis can produce large motion changes in the slave axis. Consider a case of simple gearing where the slave axis is programmed to move five times the motion of the master axis. Using the early examples of a fixed sample period of one millisecond and a motion of 1500 motion events per second, the master velocity will be captured as one thousand events per second in one sample period and two thousand events per second in the next sample period. This will cause the slave to move at a velocity of five thousand events per second in one period and ten thousand events per second in the next. Clearly, a more accurate method of measuring the master axis's motion will significantly improve the motion of the slave axis.

In fact, the invention will significantly improve the control of multi-axis coordinated motion even in systems that use the invention to measure the motion of the master axis and use the more traditional method to measure the feedback motion of the slave axis.

This invention features a method of measuring discrete incremental feedback from motion systems that create a discrete feedback pulse for every unit of motion that is accomplished by the motion system, the method comprising: establishing a minimum feedback pulse sampling period, and accumulating feedback pulses during a variable-length sampling period. Upon the first feedback pulse after the minimum sampling period, the current sampling period is ended, and the next sampling period is begun. The quantity of feedback pulses accumulated during the current sampling period is then determined.

The step of establishing a minimum feedback pulse sampling period is based upon providing a high frequency clock signal. The period of the clock signal must be less than the shortest period between feedback pulses, and is preferably at least ten times less than the shortest period between feedback pulses. The minimum feedback pulse sampling period is generally a multiple of the clock signal period. The sampling periods can begin and end only concurrently with a clock signal. In this case, the method of measuring discrete, incremental feedback from motion systems may further comprise calculating estimated motion velocity by dividing the number of feedback pulses accumulated during a sampling period by the time period of such sampling period. The time period of such sampling period is preferably determined by counting the number of clock signals occurring during the sampling period.

Also featured is a method of measuring discrete, incremental feedback from motion systems that create a discrete feedback pulse for every unit of motion that is accomplished by the motion system, the method comprising providing for a variable feedback pulse sampling period, and accumulating feedback pulses during each sampling period.

BRIEF DESCRIPTION OF THE DRAWING

Other objects, features and advantages will occur to those skilled in the art from the following description of the preferred embodiments and the accompanying drawing, which is a schematic diagram of a system for accomplishing the invention.

DETAILED DESCRIPTION OF THE PREFERRED EMBODIMENTS

The invention may be accomplished with the system depicted in the figure. Clock Generator 1 produces Clock signal 11. There are also one or more Incremental Position Feedback signal(s) 12 received by Feedback Receiver 2. Feedback Receiver 2 provides electrical conditioning and transformation of the incoming feedback signal(s). The output of Feedback Receiver 2 is Conditioned Feedback signal(s) 13. Conditioned Feedback signal 13 and Clock signal 11 connect to Motion Event Generator 3. The output of Motion Event Generator 3 is Motion Event signal 14, which is a signal that has a single pulse for every occurrence of a motion event indicated by Feedback signal(s) 12. Motion Event Generator 3 also outputs Motion Direction signal 19.

Clock signal 11 and Capture signal 15 connect to Period Counter 4, which counts up on every incidence of Clock signal 11 and resets to zero on Capture signal 15. The output of Period Counter 4, Period Count signal 18, connects to Period Count Register 5 and Period Comparator 6. Period Comparator 6 compares the output of Period Counter 4 with a fixed constant that sets the minimum sample period for the implementation. The output of Period Comparator 6, Period OK signal 21, along with Motion Event signal 14 are the inputs to Capture Generator 9. The output of Capture Generator 9 is Capture signal 15, which asserts on the next assertion of the Motion Event signal 14 after the minimum sample period (determined by the Period Comparator 6) has been satisfied. Period Count Register 5 saves the output of Period Counter 4 when indicated by Capture signal 15

The preferred embodiment also includes Event Counter 7 and Event Count Register 8. Event Counter 7 increments or decrements on Motion Event signal 14 and Motion Direction signal 19 and resets on Capture signal 15. Event Count Register 8 saves the output of Event Counter 7 when indicated by Capture signal 15. Period Count Register 5 produces Period Count Output signal 16, which is the period of the just-completed sampling period. Event Count Register 8 produces Event Count Output signal 17, which is the number of events occurring in the just-completed sampling period. Signals 16 and 17 are connected to a microprocessor bus and can be read by a microprocessor using well-known techniques.

The Period Counter 4 counts the number of clocks produced by the Clock Generator 1. When this number exceeds the minimum (determined by Period Comparator 6), the next Motion Event 14 causes the Period Count Register 5 to capture the count value of the Period Counter 4 and the Event Count Register 8 to capture the count value of Event Counter 7. The outputs of these registers are read by a computation device (such as a microprocessor) to calculate the motion information. The change in position is equal to the Event Count Output 17. The estimated velocity is the Event Count Output 17 divided by the result of multiplying the Period Count Output 16 times the period of Clock signal 11.

Other embodiments will occur to those skilled in the art and are within the following

What is claimed is:

1. A method of measuring discrete incremental feedback from motion systems that create feedback pulses, the method comprising:

establishing a minimum feedback pulse sampling period;

providing a feedback receiving device and using it to accumulate feedback pulses during a sampling period;

upon the first accumulated feedback pulse after the minimum feedback pulse sampling period, ending the current sampling period and beginning the next sampling period; and providing an event counting device and using it to determine the quantity of feedback pulses accumulated during the current sampling period.

2. The method of measuring discrete, incremental feedback from motion systems of claim 1 further comprising providing a clock device that produces a clock signal, and wherein the minimum feedback pulse sampling period is comprised of one or more periods of the clock signal.

3. The method of measuring discrete, incremental feedback from motion systems of claim 2 wherein the period of the clock signal is less than the shortest period between feedback pulses.

4. The method of measuring discrete, incremental feedback from motion systems of claim 3 wherein the period of the clock signal is less than or equal to one-tenth the shortest period between feedback pulses.

5. The method of measuring discrete, incremental feedback from motion systems of claim 2 wherein the minimum feedback pulse sampling period is a multiple of the clock signal period.

6. The method of measuring discrete, incremental feedback from motion systems of claim 2 wherein sampling periods can begin and end only concurrently with a clock signal.

7. The method of measuring discrete, incremental feedback from motion systems of claim 6 further comprising calculating estimated motion velocity by dividing the number of feedback pulses accumulated during a sampling period by the time period of such sampling period.

8. The method of measuring discrete, incremental feedback from motion systems of claim 7 wherein the time period of such sampling period is determined by counting the number of clock signals occurring during the sampling period.

\* \* \* \* \*